(12) United States Patent
Shieh et al.

(10) Patent No.: US 7,539,514 B2
(45) Date of Patent: May 26, 2009

(54) SYSTEM AND METHOD FOR USING A TEMPORARY ELECTRONIC SERIAL NUMBER FOR OVER-THE-AIR ACTIVATION OF A MOBILE DEVICE

(75) Inventors: Hugh Shieh, Issaquah, WA (US); Greg A. Wong, Mercer Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 828 days.

(21) Appl. No.: 10/409,770

(22) Filed: Apr. 8, 2003

(65) Prior Publication Data

US 2008/0171532 A1 Jul. 17, 2008

Related U.S. Application Data

(63) Continuation of application No. 09/707,593, filed on Nov. 7, 2000, now Pat. No. 6,591,098.

(51) Int. Cl.
*H04B 1/38* (2006.01)
*H04M 1/00* (2006.01)
*H04M 3/00* (2006.01)
*H04M 1/66* (2006.01)
*H04Q 7/20* (2006.01)
*H04K 1/00* (2006.01)

(52) U.S. Cl. ............... 455/558; 455/410; 455/419; 455/435.2; 455/551; 380/249

(58) Field of Classification Search ........... 455/420, 455/558, 551, 410, 435.2, 419; 380/249
See application file for complete search history.

(56) References Cited

U.S. PATENT DOCUMENTS 5,483,672 A 1/1996 Sasuta (Continued)

FOREIGN PATENT DOCUMENTS

EP 0 820 206 A2 1/1998

(Continued)

OTHER PUBLICATIONS

Vedder, "The Subscriber Identity Module," 8 pages [downloaded from the World Wide Web on Sep. 12, 2001].

(Continued)

*Primary Examiner*—Fan Tsang
*Assistant Examiner*—Lisa Hashem
(74) *Attorney, Agent, or Firm*—Davis Wright Tremaine LLP; Michael M. Donohue; Heather M. Colburn

(57) ABSTRACT

A system and method for activating a subscriber identification module (SIM) based mobile device in a PCS/ANSI type wireless network. The method comprises pre-programming the SIM card of the mobile device with temporary activation identifiers, such as an international mobile station identity (IMSI) and/or a mobile identification number (MIN), and a temporary electronic serial number. The temporary electronic serial number, rather than the mobile device actual electronic serial number, is used to identify the mobile device during registration and activation. The network identifies the temporary electronic serial number associated with the SIM vendor and invokes an over-the-air activation procedure especially for the SIM card mobile devices. A SIM-over-the-air-activation processor is notified to perform the activation for that mobile device on the PCS wireless network. Authentication of the mobile device may be bypassed and the mobile device is instructed to transmit its actual electronic serial number for future registrations. Once the activation process is completed, the temporary activation identifiers are overwritten.

32 Claims, 5 Drawing Sheets

U.S. PATENT DOCUMENTS

| | | | |
|---|---|---|---|
| 5,485,505 | A | 1/1996 | Norman et al. |
| 5,548,586 | A | 8/1996 | Kito et al. |
| 5,603,084 | A | 2/1997 | Henry, Jr. et al. |
| 5,625,885 | A | 4/1997 | Nakazawa et al. |
| 5,675,628 | A * | 10/1997 | Hokkanen .................... 455/433 |
| 5,742,910 | A * | 4/1998 | Gallant et al. ............... 455/558 |
| 5,748,720 | A * | 5/1998 | Loder ......................... 455/406 |
| 5,854,982 | A | 12/1998 | Chambers et al. |
| 5,878,339 | A | 3/1999 | Zicker et al. |
| 5,887,249 | A | 3/1999 | Schmid |
| 5,887,253 | A | 3/1999 | O'Neil et al. |
| 5,918,175 | A | 6/1999 | Tayloe et al. |
| 5,920,814 | A * | 7/1999 | Sawyer et al. ............. 455/422.1 |
| 5,937,352 | A | 8/1999 | Courtney et al. |
| 5,954,817 | A * | 9/1999 | Janssen et al. ............... 713/169 |
| 5,956,636 | A * | 9/1999 | Lipsit ......................... 455/411 |
| 5,970,059 | A | 10/1999 | Ahopelto et al. |
| 6,003,112 | A | 12/1999 | Tetrick |
| 6,014,561 | A * | 1/2000 | Molne ......................... 455/419 |
| 6,016,428 | A | 1/2000 | Diachina et al. |
| 6,018,656 | A | 1/2000 | Shirai |
| 6,035,189 | A | 3/2000 | All-Vehmas et al. |
| 6,073,015 | A | 6/2000 | Berggren et al. |
| 6,073,016 | A | 6/2000 | Hulthen et al. |
| 6,097,963 | A | 8/2000 | Boltz et al. |
| 6,266,523 | B1 | 7/2001 | Cook et al. |
| 6,295,291 | B1 * | 9/2001 | Larkins ...................... 370/352 |
| 6,366,777 | B1 * | 4/2002 | Uusitalo ..................... 455/433 |
| 6,381,454 | B1 * | 4/2002 | Tiedemann et al. ......... 455/419 |
| 6,393,298 | B1 | 5/2002 | Fulton |
| 6,529,727 | B1 * | 3/2003 | Findikli et al. ............... 455/411 |
| 6,546,243 | B2 * | 4/2003 | Tiedemann et al. ......... 455/419 |
| 6,591,098 | B1 * | 7/2003 | Shieh et al. ................. 455/419 |
| 6,647,260 | B2 * | 11/2003 | Dusse et al. ................ 455/419 |
| 6,754,492 | B1 * | 6/2004 | Stammers et al. ........ 455/435.1 |
| 6,879,825 | B1 * | 4/2005 | Daly ........................... 455/419 |
| 6,957,066 | B1 * | 10/2005 | Stammers et al. ........ 455/435.1 |
| 7,039,403 | B2 | 5/2006 | Wong |
| 7,085,567 | B1 * | 8/2006 | Rajaniemi ................. 455/435.1 |
| 7,266,371 | B1 * | 9/2007 | Amin et al. .................. 455/419 |
| 2002/0006808 | A1 * | 1/2002 | Onaka et al. ................ 455/550 |
| 2002/0193100 | A1 | 12/2002 | Riffe et al. |
| 2002/0197991 | A1 * | 12/2002 | Anvekar et al. ............. 455/432 |
| 2003/0083068 | A1 | 5/2003 | Wong |
| 2004/0260928 | A1 * | 12/2004 | Immonen .................... 713/175 |
| 2005/0059430 | A1 * | 3/2005 | Beeman et al. ............. 455/558 |
| 2005/0060364 | A1 * | 3/2005 | Kushwaha et al. .......... 709/200 |
| 2005/0195975 | A1 * | 9/2005 | Kawakita ..................... 380/30 |
| 2005/0246282 | A1 * | 11/2005 | Naslund et al. ............... 705/52 |
| 2006/0116169 | A1 * | 6/2006 | Park ........................... 455/558 |
| 2006/0142007 | A1 | 6/2006 | Wong |
| 2006/0189298 | A1 * | 8/2006 | Marcelli ..................... 455/411 |
| 2006/0276226 | A1 * | 12/2006 | Jiang ......................... 455/558 |
| 2007/0129057 | A1 * | 6/2007 | Xu et al. ..................... 455/410 |
| 2007/0149178 | A1 * | 6/2007 | Thorson et al. .......... 455/414.1 |
| 2007/0167161 | A1 * | 7/2007 | Cheng et al. ............. 455/435.1 |
| 2007/0186115 | A1 * | 8/2007 | Gao et al. ................... 713/184 |
| 2008/0003980 | A1 * | 1/2008 | Voss et al. .................. 455/411 |
| 2008/0228901 | A1 * | 9/2008 | Choi et al. .................. 709/220 |
| 2008/0293408 | A1 * | 11/2008 | Jiang ......................... 455/433 |

FOREIGN PATENT DOCUMENTS

| | | |
|---|---|---|
| EP | 0820206 B1 | 1/1998 |
| WO | 0001187 | 1/2000 |
| WO | WO 00/01187 | 1/2000 |

OTHER PUBLICATIONS

International Telecommunications Union, ITU-T Recommendation E.212, "The International Identification Plan for Mobile Terminals and Mobile Users," 11 pages (Nov. 1998).

Heine, *GSM Networks: Protocols, Terminology, and Implementation*, Artech House, pp. iii-xi, 1-18, 31-38, 125-170, 185-273, and 407-416 (1999).

"GSM Architectures and Interfaces," 20 pages (1998).

"The SS7 Signaling Connection Control Part Relay System," 12 pages [downloaded from the World Wide Web on May 16, 2002].

"Introduction to GSM," 6 pages [downloaded from the World Wide Web on May 14, 2002].

"Centrex, Feature Library," 1 page [downloaded from the World Wide Web on May 15, 2002].

"GSM—Global System for Mobile Communication," 3 pages [downloaded from the World Wide Web on May 15, 2002].

Scourias, "A Brief Overview of GSM," 11 pages [downloaded from the World Wide Web on May 16, 2002].

"Understanding Telecommunicatios," 21 pages [downloaded from the World Wide Web on May 16, 2002].

Christensen, "Mobile Networking," 6 pages (2000).

* cited by examiner

SYSTEM AND METHOD FOR USING A TEMPORARY ELECTRONIC SERIAL NUMBER FOR OVER-THE-AIR ACTIVATION OF A MOBILE DEVICE

RELATED APPLICATIONS

This application is a continuation of application Ser. No. 09/707,593, filed Nov. 7, 2000 now U.S. Pat. No. 6,591,098, which is incorporated herein by reference. This application is related to application Ser. No. 09/707,671 entitled "Activation and Remote Modification of Wireless Services," filed on Nov. 7, 2000 that is incorporated herein by reference.

BACKGROUND OF THE INVENTION

1. Field of the Invention

The invention relates to a system and method of activating a mobile device in a PCS-type wireless network, and more specifically, to a system and method of identifying and activating a SIM-based mobile device in a PCS-type wireless network.

2. Discussion of Related Art

New users of mobile devices, such as cellular telephones, palm pilots, and the like, can register and activate their mobile devices with a wireless network in several ways. One manner of registering a mobile device with a wireless network is to personally meet with a service provider, purchase or receive a wireless device, and have the service provider enter activation data into the wireless network related to the individual and the mobile device identification. In this manner, when the user begins to use the mobile device, the wireless network will recognize the user and mobile device to enable the user to make calls and communicate data.

The foregoing procedure is used in the global system for mobile communication (GSM) system. In a GSM system, an international mobile subscriber identity (IMSI) is fixed in a subscriber identity module (SIM) and the carrier's system records the IMSI which is reported by the wireless device after the attachment or registration process is completed.

Another method of enabling a user to register and activate a mobile device with a wireless network is through over-the-air activation (OAA). In this method, when a mobile device is first used, it identifies itself to the wireless network using temporary identification data stored on the wireless device. Through the process of the initial communication of data between the mobile device and the wireless network, the mobile device can be registered and activated with the network without the need of the user physically meeting with the service provider.

One wireless system that utilizes OAA is the ANSI-136/41 standard-compliant network. The American National Standards Institute (ANSI) is an industry standards group that coordinates volunteer standards activities in the U.S. The ANSI-136/41 network is also known as a TDMA (time-division-multiple-access) network or commonly called the personal communication service (PCS) network. In terms of this disclosure, a PCS wireless network may also refer to any wireless network that does not typically support or is capable of activating over-the-air SIM-based mobile devices such as those used in a GSM network. Another wireless network that uses the OAA is the advanced mobile phone system (AMPS). The AMPS system is an analog cellular telephone standard.

The TDMA/AMPS wireless networks include a mobile identification number (MIN) which is temporary and is overwritten in an over-the-air activation process. In an ANSI-136/41 network, the OAA is accomplished by the mobile device registering using the MIN. The MIN can be the telephone number of the mobile device. The ANSI-136 revision A specifies that the activation MIN for un-programmed mobiles shall be of the form 000-Nxx-xxxx in the North American Numbering Plan (NANP). This format conforms to the traditional 10-digit telephone number that is dialed by another party. The "000" is the area code, "Nxx" is the three-digit exchange office number and "xxxx" is the four-digit extension number. This allows for the identification and routing of the activation-MIN to an over-the-air-processor (OTAP) for temporary registration of the mobile device on the ANSI network.

These two differing wireless networks, the GSM and ANSI-136/41, do not provide cross-support for the registration/activation process. For example, a mobile device using the SIM card will not be recognized if it attempts to register and activate on an ANSI-136/41 system. This is because the registration, authentication and activation processes between these two cellular systems use different keys and algorithms. Since TDMA networks don't currently support mobile devices using SIMs, a new OTAP function is needed to perform over-the-air activation to these devices. One can program a SIM manually, through a kiosk, or have a point-of-sale person program the SIM through a special device. However, these mechanisms require some sort of physical connection to a programming device. The procedures may even vary from manufacturer to manufacturer of the SIM cards regarding the programming procedures within a GSM wireless network.

The foregoing brief explanation of the registration/activation process is for what is generally called the "second generation" of wireless services. The second generation generally refers to voice-only services, but may also refer to the ANSI-136 wireless standard. When a mobile device uses the above-described techniques for OAA and registration, the mobile device identifies itself as a second-generation device. With the advent of digital data services that enable Internet access through wireless devices, the next generation, or "third generation", of mobile devices and wireless networks are being developed. In order for a third-generation mobile device to be recognized by the network as such and take advantage of the third-generation services, the mobile device must transmit in the OAA procedures that it is a third-generation mobile device.

SUMMARY OF THE INVENTION

What is needed in the art is an over-the-air activation procedure in which a mobile device identifies itself as a third-generation mobile device to the network. Furthermore, what is needed in the art is a system and method to enable a SIM-based mobile device to be recognized, registered and activated within an ANSI-136/41 or PCS wireless network.

Accordingly, the present invention enables an ANSI-136/41 or PCS wireless network to recognize a SIM-based mobile device during the registration process so that the correct OAA procedures can be invoked for the mobile device.

The present invention further enables the network to identify the manufacturer of the SIM card within the confines of the PCS specifications.

The present invention further enables third-generation wireless devices to be registered and activated on a PCS network.

In addition, the present invention allows a SIM to be programmed or reprogrammed while seated in a wireless device.

A method according to an embodiment of the present invention accomplishes over-the-air activation of a mobile device having a removable card in a PCS wireless network. The method comprises programming the removable card with a temporary activation identifier (TAI), a SIM electronic serial number (S-ESN) and a network usage indicator field, which is set to report the activation identifier and electronic serial number during registration. During registration, the mobile device transmits the activation identifier and the SIM electronic serial number as the card identifier to the wireless network. The network identifies the SIM electronic serial number as a temporary ESN associated with the mobile device and a removable card vendor. This identification is preferably accomplished using the home location register (HLR), but may also occur at a Message Center (MC). The HLR or MC will identify the mobile device as a SIM device via the S-ESN and notify the correct vendor SIM over-the-air activation processor (SOTAP) to proceed with the OAA process. The network then invokes an over-the-air activation procedure for the mobile device.

Next, the method comprises the option of bypassing authentication procedures and programming the mobile device to send the actual electronic serial number to the mobile device for future registration. The option to bypass authentication enables the present invention to be used in both GSM and TDMA wireless systems. Therefore, if one wireless network does not allow the authentication procedure to be bypassed, then authentication can proceed. The GSM system may require authentication, for example, while other wireless networks provide for authentication to be optional. Finally, to complete the over-the-air activation process, the method comprises setting the usage indicators to transmit the actual ESN in the future and overwriting the temporary activation identifiers.

The method according to the preferred embodiment of the invention allows a PCS network to identify a manufacturer of a SIM during the registration process and insure that the correct OAA procedure can be invoked for that SIM. In this manner, the SOTAP can register/activate SIM mobile devices on the network and a PCS over-the-air processor can register/activate OAA of mobile devices not using the SIM cards.

The system according to a preferred embodiment of the present invention comprises a mobile device, a base station communicating with the mobile device via an over-the-air interface, and a mobile switching center (MSC) communicating with the base station. A home location register (HLR) or message center (MC) communicates with the MSC, an over-the-air-activation processor (OTAP) and a SIM over-the-air-activation processor (SOTAP). The OTAP and SOTAP each communicate with the MSC and the HLR or MC. The HLR or MC identifies and recognizes the S-ESN transmitted from the mobile device and communicates with the SOTAP. The SOTAP is instructed to perform the activation procedure for the mobile device. If the mobile device identifies itself to the network using the MIN/ESN or ANSI-136 standard, the HLR will instruct the OTAP to activate the mobile device on the network.

According to the network system disclosed herein, OAA can be accomplished in a PCS network for both SIM-based mobile devices and MIN/ESN-based mobile devices.

BRIEF DESCRIPTION OF THE DRAWINGS

The embodiments of the present invention may be understood with reference to the attached figures, of which.

DETAILED DESCRIPTION OF THE INVENTION

Figure 1:
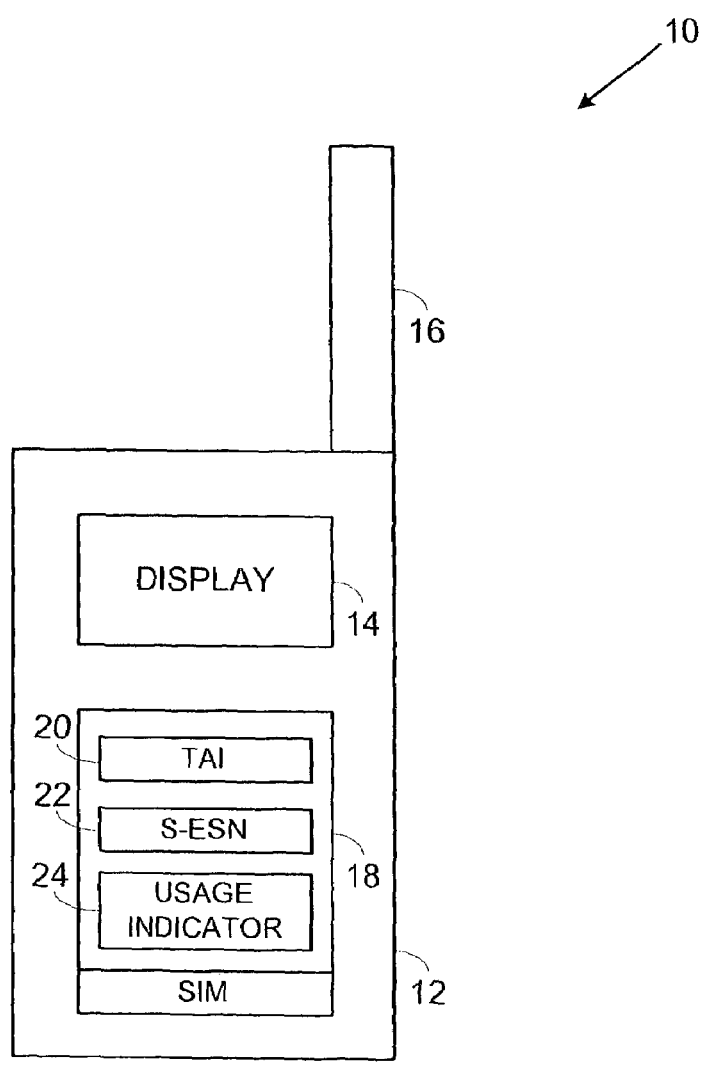
FIG. 1 illustrates a mobile device having a SIM card.

The present invention may be understood according to the detailed description provided herein. The first embodiment of the present invention comprises a system for accomplishing over-the-air activation of a mobile device in a wireless network. FIG. 1 illustrates a mobile device 10 having an outer case 12, antenna 16, a display 14, and a SIM 18. Since the mobile device 10 contains a removable SIM card 18, it is not a mobile device traditionally used in a PCS-based wireless network. Details associated with the structure and operation of the mobile device 10, such as a keyboard, speaker, internal logic, D/A converters, digital processing, modulation chips, amplifiers, etc. are not shown in FIG. 1 but are well known to those of ordinary skill in the art. The mobile device 10 may be of any known or yet to be developed mobile device, such as a cellular telephone, palm pilot, portable computer, and the like.

The SIM 18 is used to store subscriber-specific information, such as the international mobile station identity (IMSI) and an authentication key. The IMSI is comparable to the MIN used in the PCS network. According to the first embodiment of the present invention, the SIM card 18 of the mobile device 10 is pre-programmed with a temporary activation identifier (TAI) 20. The TAI may be an IMSI and/or a MIN. The SIM card 18 is further pre-programmed with a SIM-electronic serial number (S-ESN) 22 that the PCS network can interpret or associate with the specific SIM card or SIM card vendor. The S-ESN is a temporary electronic serial number that is used in the registration and activation process. This S-ESN can also identify the SIM card to the PCS or second-generation network as requiring an initial over-the-air activation procedure.

In addition, the SNM card is pre-programmed with "ANSI-136 Usage Indicators" 24. The Usage Indicators are 2-bit fields on the SIM that instruct the mobile device regarding which ESN to send to the network for authentication and which ESN to send to the network for reporting. These indicators are programmed in a field, defined in PN-4582 published by TR 45.2, and are set to report the S-ESN during the ANSI registration process, rather than the actual ESN of the mobile device 10. When the mobile device 10 registers with the ANSI-136/41 network, the mobile device 10 transmits the activation NSI/MIN and the S-ESN as the SIM identifier.

In PN-4788, ESN Usage indicator is defined as part of ANSI-136 Usage Indicators. The following are defined:

Coding of Service n1 (ESN Usage indicator)

b2=0 and b1=0: Use ESN for Reporting & Authentication b2=0 and b1=1: Use ESN for Reporting and S-ESN for Authentication According to the present invention, the following usage indicators are further defined:

b2=1 and b1=0: Use S-ESN for Reporting & Authentication

During the OAA of the SIM, the ANSI-136 Usage Indicators 24 field is activated to instruct the mobile device 10 to send the ACTUAL mobile device ESN for future registration. Being only 2-bits, there are only 4 possible combinations for the usage indicators. These additional parameters, only reside on a GAIT SIM card—and do not reside on the standard GSM directory.

Figure 2:
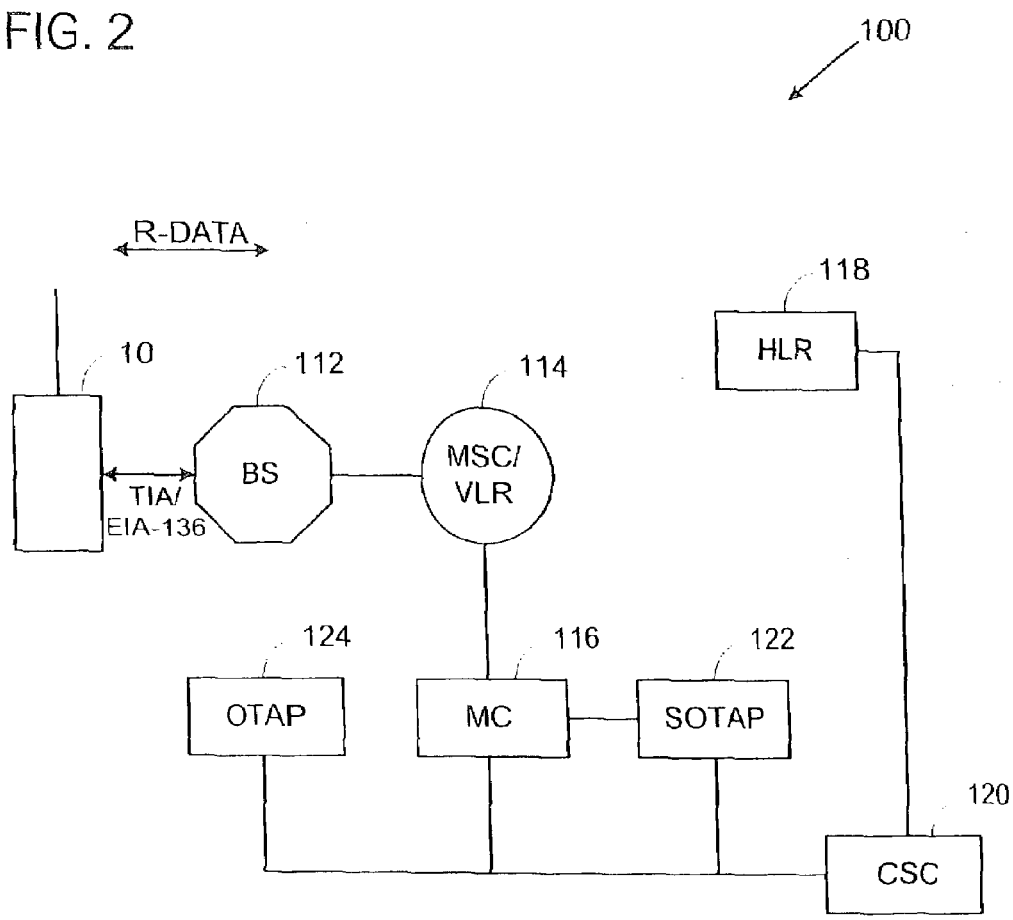
FIG. 2 illustrates an exemplary wireless network according to the first embodiment of the present invention.

A wireless network 100 according to the first embodiment of the present invention is illustrated in FIG. 2. This network may contain portions of different networks. For example, several nodes may be part of a PCS network, while other nodes, or servers, may be part of a GSM network. The mobile device 10 communicates with a base station 112 using the over-the-air interface according to the ANSI-136 standard (also known as the Telecommunication Industry Association/Electronic Industries Alliance-136 standard (TIA/EIA-136)). The base station 112 communicates with a mobile switching center (MSC) 114 and visitor location register (VLR) 114. The MSC/VLR 114 provides the same functionality as a central office switch in a public-switched telephone network and is additionally responsible for call processing, mobility management, and radio resource management. The VLR 114 performs a database function local to the MSC 114 and maintains temporary records associated with non-home mobile devices registered for service with the network. The MSC/VLR 114 communicates with a teleservice server/OTAP 124 through message center (MC) 116. The OTAP 124 provides the formatting, storage, and forwarding of over-the-air-activation messages. The OTAP 124 and MSC/VLR 114 communicate with a home location register (HLR) 118 via, for example, the TIA/EIA-41 standard protocol in the PCS network, preferably through a customer server center (CSC) 120. The HLR 118 is the primary database in the cellular network that stores information about mobile users. It contains a record for each home subscriber that includes the mobile directory number, subscriber features, subscriber status, and current location information.

The HLR 118 or MC 116 operates a program which receives the temporary electronic serial number from the mobile device 10, associates the temporary electronic serial number with a vendor, transmits an activation notification signal to a subscriber identification card module over-the-air-activation processor and activates the mobile device on the network using the subscriber identification card module over-the-air-activation processor.

The MSC/VLR 114 communicates with a SIM-over-the-air-activation processor (SOTAP) 122 through the MC 116. The HLR 118 communicates with SOTAP 122 via a customer service center (CSC) 120. The communication means between these nodes in the network 100 may be proprietary or may use open standards. The protocols may be SS7 or IP-based. The physical means by which the elements are grouped or left separate, and the interfaces—whether proprietary or open—are left to the carrier.

In a variation of this embodiment, the MSC/VLR 114 may register the subscriber on a pseudo-HLR (the MC 116) for OAA. In this case, the registration from the MSC 114 is sent to the MC 116, whereby the MC 116 interprets the S-ESN or ESN and sends notification to the SOTAP 122 or OTAP 124 respectively, for processing.

During the registration process for a mobile device 10 with the network 100, the HLR 118 or MC 116 will identify the mobile device 10 as a SIM device via the S-ESN data and notify the correct vendor SOTAP 122 to initiate the OAA process. The network 100 then identifies the S-ESN associated with the SIM vendor and invokes the proper OAA procedure for that SIM card. This may involve the HLR 118 or MC 116 notifying the SOTAP 122 that a SIM mobile device 10 is registering with a PCS network and that the SOTAP 122 should initiate its OAA process. The authentication procedure, known to those of skill in the art and not described in detail herein, may be bypassed because the mobile device is reporting an S-ESN. The identification of a SIM at registration allows for bypassing the authentication procedure when the SIM is in the pre-OAA state. This alleviates the network 100 having to map secure authentication keys against the temporary identification information, or information that might not be enough to differentiate between two pre-OAA SIMs.

Although the authentication procedure is bypassed in the first embodiment, which is the preferred embodiment, it does not have to be bypassed to perform and practice the invention described and claimed herein.

Other network configurations and arrangements are within the scope of this invention, and in no way are FIG. 1 and FIG. 2 meant to confine the concepts to those illustrated.

Figure 3:
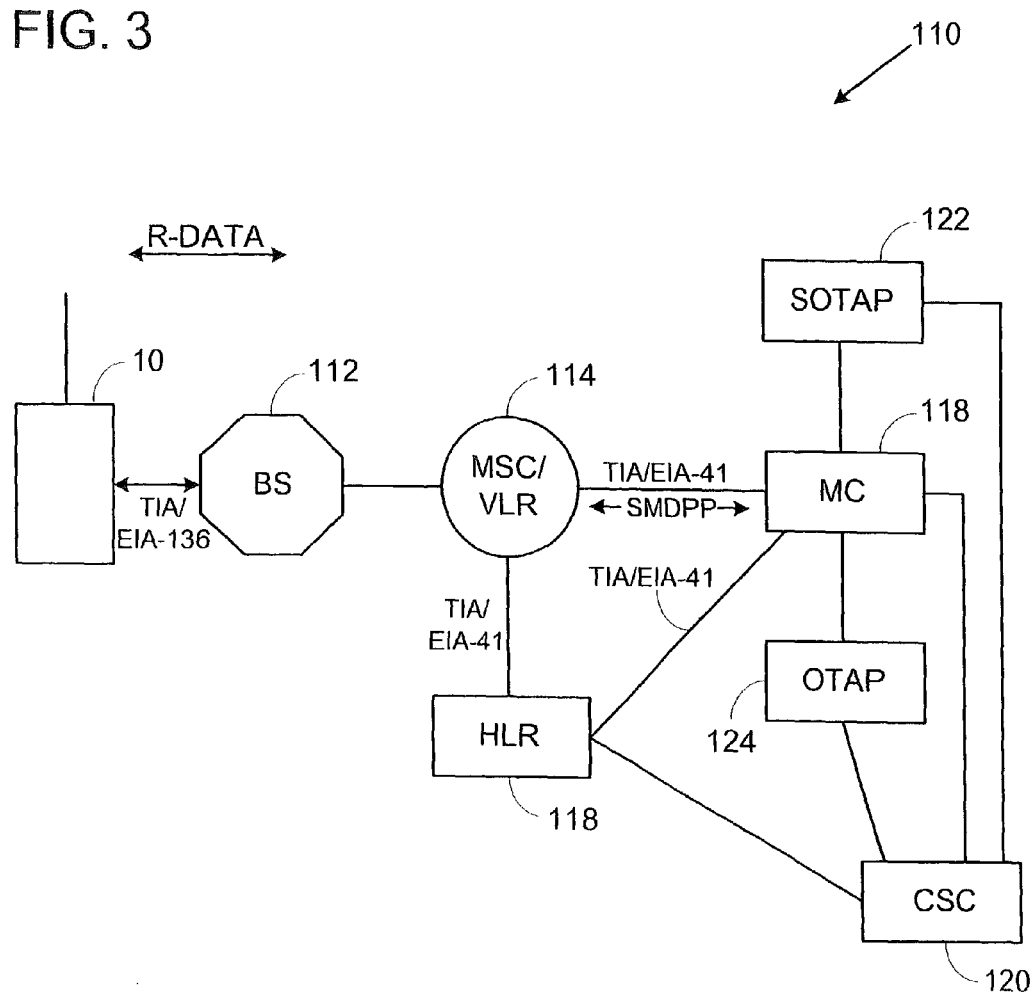
FIG. 3 shows an example of a system according to the second embodiment of the present invention.

A second embodiment of the present invention is shown in FIG. 3. In this embodiment, the nodes of the network 110 operate similar to those in the first embodiment shown in FIG. 2, except that the network configuration is modified as shown. This embodiment illustrates the communication protocols between nodes and locates the HLR 118 as communicating directly with the MC 116 and MSC/VLR 114, as well as the Customer Service Center (CSC) 120 as in the first embodiment of FIG. 2. For example, the ITA/EIA-41 protocol is preferably used to transmit intersystem data between the various nodes (MSC/VLR 114, MC 116 and HLR 118) of the network. Data between the MC 116 and MSC/VLR 114 may also be transmitted using the short message service (SMS). Such messages, also known as short message delivery point-to-point (SMDPP) messages, may be, for example, emails, pages, graphics, alpha-numeric characters, and the like.

Figure 4:
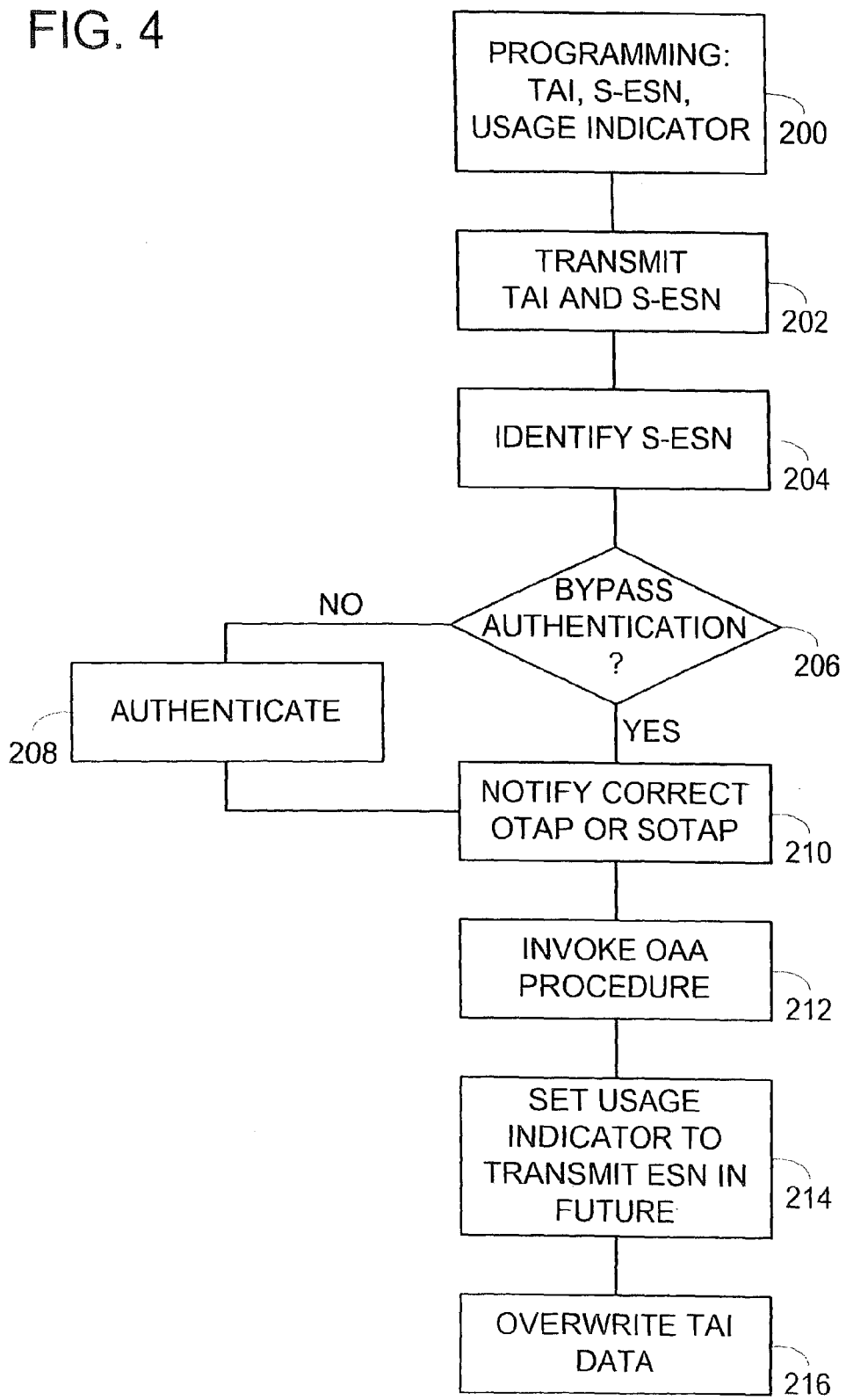
FIG. 4 shows an example of a process according to the third embodiment of the present invention.

A third embodiment of the invention is illustrated by way of the example process shown in FIG. 4. According to this embodiment, a method is proposed for enabling activation of a SIM-based mobile device in a PCS wireless network. The method comprises programming (200) the removable card with a temporary activation identifier (TAI), a SIM electronic serial number (S-ESN) and a network usage indicator field, which is set to report the activation electronic serial number during registration. During registration of the mobile device with a PCS network, the mobile device transmits (202) the TAI and S-ESN as the SIM card identifier. The network identifies (204) the SIM based mobile device using the S-ESN associated with a removable card vendor. The authentication procedures may or may not be bypassed according to the present invention. Preferably, authentication is bypassed (206) to alleviate the network of the requirement of mapping secure authentication keys against the temporary identification information, or against information that may not be unique enough to differentiate between two pre-OAA SIM cards. If the network responds to the bypass authentication query of step 206 with a "no" (meaning that authentication is not bypassed), then authentication proceeds (208).

After authentication (208), or after the authentication procedure is bypassed, the network notifies (210) the vendor OAA processing server of the registration of a SIM-based mobile device in a PCS network. The network notifies the correct OTAP or SOTAP of the registration. The appropriate processor then invokes (212) an over-the-air activation procedure for the mobile device. The processor may be of any known computer or network processor capable of carrying out the functions of the disclosed invention.

After activation, the network instructs (214) the mobile device to transmit the actual electronic serial number (ESN) for future registrations. This is accomplished by setting the usage indicator to send the actual ESN in the future. Thus, the usage indicators may be set to b2=0 and b1=0 or b2=0 and b1=1, according to PN-4788, which instructs the mobile device to use the ESN in future reporting to the network. Finally, the method comprises overwriting (216) the temporary activation identifiers. In this manner, the actual ESN of the mobile device is not reported to the network until the OAA is successfully completed.

Figure 5:
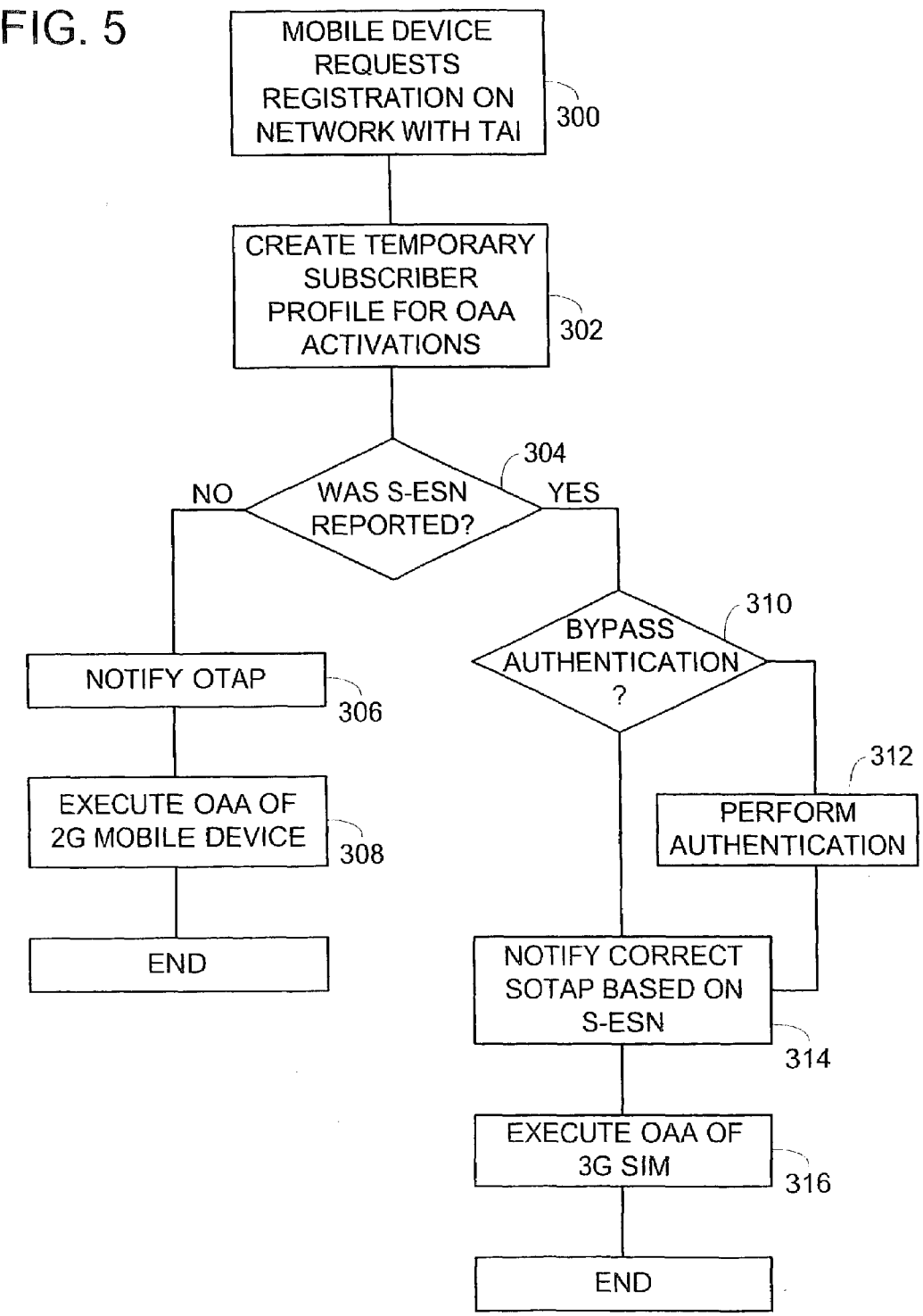
FIG. 5 shows another example of a process according to the fourth embodiment of the present invention.

The fourth embodiment of the present invention is illustrated in FIG. 5, which shows an exemplary method of providing over-the-air activation of either a second-generation wireless device or a third-generation wireless device. The wireless device initiates the process by requesting (300) registration on the network using a temporary activation identifier (TAI). The network receives the TAI and creates (302) a temporary subscriber profile for OAA activation. The network inquires (304) whether the S-ESN was reported to determine whether the device is a second-generation device or third-generation device. If the S-ESN was not reported, the OTAP is notified (306) and the OAA is executed (308) for the second-generation mobile device. If the S-ESN was reported, then the process inquires (310) whether authentication should be bypassed. If authentication is not to be bypassed, then authentication is performed (312). If authentication is bypassed, then the process proceeds directly to notify (314) the correct SOTAP, based on the S-ESN, to begin OAA. Then the network executes (316) OAA for the third-generation SIM.

The benefits and advantages of the embodiments of the present invention include the fact that there will be no standards modification required for this procedure. Translations of the ANSI HLR programming will cause it to route SIM-based mobile devices that require OAA to a SOTAP based on either activation MIN or S-ESN.

Although the foregoing description provides many specific details, it is not meant to limit the scope of the invention in any manner. Other patents or documents may be combined with this disclosure to inform the reader as to insubstantial changes or modifications to the inventions recited in the appended claims. Thus, the scope of the invention is governed by the appended claims, and their legal equivalents, rather than by the exemplary embodiments discussed above.

We claim:

1. A method of over-the-air activation of a wireless device comprising a device electronic serial number and a temporary electronic serial number different from the device electronic serial number, the method comprising:
   receiving the temporary electronic serial number from the wireless device wherein the temporary electronic serial number is preprogrammed onto a removable identification card coupled to the wireless device;
   associating the temporary electronic serial number with a vendor;
   selecting one of a plurality of over-the-air activation processes each associated with a different vendor, the selected one of the plurality of over-the-air activation processes being associated with the same vendor associated with the temporary electronic serial number; and
   activating the wireless device according to the selected over-the-air activation process associated with the vendor that is associated with the temporary electronic serial number.

2. The method of claim 1, wherein a home location register selects the one of the plurality of over-the-air activation processes.

3. The method of claim 1, further comprising determining that the wireless device is a third generation wireless device.

4. The method of claim 1, wherein a message center selects the one of the plurality of over-the-air activation processes.

5. The method of claim 1, wherein the selected one of the plurality of over-the-air activation processes comprises setting a usage indicator located at the wireless device so the wireless device transmits the device electronic serial number subsequent to activation.

6. The method of claim 1, wherein the vendor is a vendor of the removable identification card coupled to the wireless device.

7. The method of claim 6, wherein a network node performing the selected one of the plurality of over-the-air activation processes is associated with the vendor of the removable identification card.

8. A method for achieving wireless device over-the-air activation, the method comprising:
   transmitting a temporary electronic serial number from a wireless device, wherein the temporary electronic serial number is preprogrammed onto a removable subscriber identity module (SIM) card coupled to the wireless device, and the wireless device comprises a device electronic serial number different from the temporary electronic serial number;
   receiving the temporary electronic serial number at a first network node and relaying the temporary electronic serial number to a second network node;
   receiving the temporary electronic serial number at the second network node:
   the second network node associating the temporary electronic serial number with a vendor;
   the second network node selecting one of a plurality of over-the-air activation processes each associated with a different vendor, the selected one of the activation processes being associated with the same vendor associated with the temporary electronic serial number; and
   invoking the selected one of the over-the-air activation processes to activate the wireless device.

9. The method of claim 8, wherein the selected one of the over-the-air activation processes executes at the second network node.

10. The method of claim 8, wherein the selected one of the over-the-air activation processes executes at a third network node.

11. The method of claim 8, wherein the second network node is a home location register.

12. The method of claim 8, wherein the second network node is a message center.

13. The method of claim 8, wherein the wireless device communicates via an American National Standards Institute (ANSI)-136/41 protocol.

14. The method of claim 8, wherein the wireless device communicates via a personal communication service (PCS) protocol.

15. The method of claim 8, wherein the temporary electronic serial number is a SIM-electronic serial number.

16. The method of claim 15, wherein the removable SIM card is further preprogrammed with a temporary activation identifier.

17. The method of claim 16, wherein the wireless device initiates activation by transmitting the temporary activation identifier.

18. The method of claim 17, further comprising receiving the temporary activation identifier and creating a temporary subscriber profile for over-the-air activation.

19. The method of claim 18, further comprising determining whether the wireless device is second or third generation device based on whether a SIM-electronic serial number is reported by the mobile device.

20. The method of claim 19, wherein the one of the over-the-air activation processes is selected based on whether the SIM-electronic serial number was reported by the mobile device.

21. The method of claim 15, wherein the SIM-electronic serial number identifies the SIM card.

22. The method of claim 15, wherein the vendor associated with the temporary electronic serial number is a SIM card vendor associated with the SIM-electronic serial number.

23. The method of claim 15, wherein the removable SIM card is further preprogrammed with usage indicators, and the method further comprises determining, based on the usage indicators, whether to transmit the temporary electronic serial number or the device electronic serial number during authentication.

24. The method of claim 15, wherein the removable SIM card is further preprogrammed with usage indicators, and the method further comprises determining, based on the usage indicators, whether to transmit the temporary electronic serial number or the device electronic serial number for reporting.

25. The method of claim 15, wherein the removable SIM card is further preprogrammed with usage indicators, and the method further comprises determining, based on the usage indicators, whether to transmit the temporary electronic serial number or the device electronic serial number for activation.

26. An activation method for a wireless device comprising a device electronic serial number and a temporary electronic serial number different from the device electronic serial number, the temporary electronic serial number being preprogrammed onto a subscriber identity module (SIM) card, the method comprising:
receiving an electronic serial number from the wireless device;
determining that the electronic serial number received is the temporary electronic serial number preprogrammed onto the SIM card;
associating the temporary electronic serial number with a vendor;
selecting one of a plurality of over-the-air activation processes, each associated with a different vendor, the selected one of the plurality of over-the-air activation processes being associated with the same vendor associated with the temporary electronic serial number; and
invoking the selected over-the-air activation process.

27. The method of claim 26, wherein the method is performed at one or more network nodes.

28. The method of claim 26, wherein the method is performed by an America National Standards Institute (ANSI)-136/41 network.

29. The method of claim 26, wherein the method is performed by a global system for mobile communication (GSM) network.

30. The method of claim 26, wherein invoking the procedure comprises sending a communication to another network node to perform the selected one of the plurality of over-the-air-activation processes.

31. An activation method performed by one or more network nodes, the method comprising:
receiving a temporary electronic serial number from a mobile device having a device electronic serial number that is different from the temporary electronic serial number being preprogrammed onto a subscriber identity module (SIM) card of the mobile device;
associating the temporary electronic serial number with a vendor;
selecting one of a plurality of over-the-air activation procedures each associated with a different vendor, the selected one of the plurality of over-the-air activation processes being associated with the same vendor associated with the temporary electronic serial number; and
invoking the selected one of the plurality of over-the-air activation procedures.

32. The method of claim 31, wherein the selected one of the plurality of over-the-air activation procedures comprises setting a usage indicator located at the wireless device causing the wireless device to transmit the device electronic serial number instead of the temporary electronic serial number subsequent to activation.

* * * * *